US010152894B2

(12) United States Patent
Adler et al.

(10) Patent No.: US 10,152,894 B2
(45) Date of Patent: Dec. 11, 2018

(54) COMMUNITY NOISE MANAGEMENT WITH AIRCRAFT DYNAMIC PATH VARIATION

(71) Applicant: The Boeing Company, Chicago, IL (US)

(72) Inventors: Charles Otis Adler, Bellevue, WA (US); Sheila Ruth Conway, Seattle, WA (US); Douglas A. Stoll, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 185 days.

(21) Appl. No.: 15/245,302

(22) Filed: Aug. 24, 2016

(65) Prior Publication Data
US 2018/0061245 A1   Mar. 1, 2018

(51) Int. Cl.
*G08G 5/00* (2006.01)
*G01C 21/20* (2006.01)
(Continued)

(52) U.S. Cl.
CPC .......... *G08G 5/0026* (2013.01); *G01C 21/20* (2013.01); *G08G 5/006* (2013.01); *G08G 5/0043* (2013.01);
(Continued)

(58) Field of Classification Search
CPC .... G08G 5/0026; G08G 5/006; G08G 5/0013; H04W 4/008; H04W 4/80; G05D 1/104; H04L 67/12
See application file for complete search history.

(56) References Cited

U.S. PATENT DOCUMENTS 8,185,258 B2   5/2012   Dey et al.
8,731,810 B2   5/2014   Conway
(Continued)

FOREIGN PATENT DOCUMENTS

EP     2287822 A2   2/2011
EP     2620932 A1   7/2013
WO   WO 2012/078231  6/2012

OTHER PUBLICATIONS

Jinhua Li et al., "AIRNOISE: a Tool for Preliminary Noise-Abatement Terminal Approach Route Design", AIAA Aviation 16th AIAA Aviation Technology, Integration and Operations Conference, Jun. 13-17, 2016.
(Continued)

*Primary Examiner* — Stephen Holwerda
(74) *Attorney, Agent, or Firm* — McDonnell Boehnen Hulbert & Berghoff LLP

(57) ABSTRACT

An example method for flight path variation of an aircraft for noise management includes receiving noise inquiries of a community related to aircraft noise during flight over the community, receiving an output from noise sensors positioned within the community, determining a noise distribution plan for additional aircraft flying over the community so as to steer the additional aircraft and distribute additional aircraft noise in response to the noise inquiries and the output from the noise sensors, and based on flight path data of the additional aircraft and the noise distribution plan, assigning a flight path modification to aircraft via a data communication link. The flight path modification informs the aircraft to adjust the flight path to remain within associated margins of a required navigation performance (RNP) instrument flight procedure and to reduce noise impact to the community underneath the flight path.

20 Claims, 8 Drawing Sheets

(51) Int. Cl.
    *H04W 4/80*     (2018.01)
    *G05D 1/10*     (2006.01)
    *H04L 29/08*    (2006.01)
    *G08G 5/02*     (2006.01)

(52) U.S. Cl.
    CPC .......... *G08G 5/0082* (2013.01); *G05D 1/104* (2013.01); *G08G 5/0013* (2013.01); *G08G 5/025* (2013.01); *H04L 67/12* (2013.01); *H04W 4/80* (2018.02)

(56) References Cited

U.S. PATENT DOCUMENTS

| | | | | |
|---|---|---|---|---|
| 2003/0004619 | A1* | 1/2003 | Carriker | G01C 23/00 |
| | | | | 701/3 |
| 2005/0098681 | A1 | 5/2005 | Berson et al. | |
| 2006/0111818 | A1* | 5/2006 | Ishii | G01C 21/32 |
| | | | | 701/3 |
| 2006/0191326 | A1 | 8/2006 | Smith et al. | |
| 2007/0217288 | A1* | 9/2007 | Barry | G08G 5/0026 |
| | | | | 367/136 |
| 2008/0036659 | A1* | 2/2008 | Smith | G01S 13/765 |
| | | | | 342/454 |
| 2008/0114503 | A1* | 5/2008 | Burnside | B64D 31/06 |
| | | | | 701/3 |
| 2011/0046818 | A1* | 2/2011 | Herkes | G01H 17/00 |
| | | | | 701/3 |
| 2012/0150426 | A1 | 6/2012 | Conway | |
| 2013/0092791 | A1* | 4/2013 | Bakker | G05D 1/0653 |
| | | | | 244/1 N |
| 2013/0190950 | A1* | 7/2013 | Shukla | G01H 17/00 |
| | | | | 701/3 |
| 2014/0222337 | A1* | 8/2014 | McGregor | G06Q 10/0631 |
| | | | | 701/528 |

OTHER PUBLICATIONS

Extended European Search Report prepared by the European Patent Office in Application No. 17173862.8 completed Nov. 20, 2017.

Gannt, ARL Briefing, U.S. Army Research Laboratory, 2003.

* cited by examiner

COMMUNITY NOISE MANAGEMENT WITH AIRCRAFT DYNAMIC PATH VARIATION

FIELD

The present disclosure relates generally to methods for modifying a flight path of an aircraft, and more particularly to calculating, by a system onboard the aircraft, as well as by ground based systems, a modification to the flight path to be flown by the aircraft that causes the aircraft to remain within containment boundaries of a Required Navigation Performance (RNP) instrument flight procedure while reducing noise impact to the communities underneath the flight path and meeting the spacing and/or required arrival time requirements of the air traffic controller. Example methods utilize a capability to modify flight paths to respond to community noise requests in either a pre-planned or near real-time manner.

BACKGROUND

Performance-Based Navigation (PBN), including the widely used Required Navigation Performance (RNP) and Area Navigation (RNAV) instrument procedures, is a key part of airspace modernization worldwide. For example, RNAV and RNP-based procedure deployment is a component of the United States' airspace modernization, the Federal Aviation Administration (FAA) NextGen program, that is implementing new PBN routes and procedures to leverage emerging technologies and aircraft navigation capabilities. Modern commercial aircraft fly PBN flight paths with very high precision. The aircraft can exploit high accuracy provided by global positioning system (GPS)-based navigation systems, modern Flight Management Systems (FMSs) and Flight Control Systems (FCSs). Due to this highly accurate path-keeping capability, the use of PBN removes much of the variability traditionally seen in aircraft flight paths, and results in highly repeatable operations.

The benefits of using RNAV and RNP procedures thus include improved aircraft stability on approach, improved aircraft predictability for air traffic control, reduced fuel burn, lower track miles, improved airport capacity, and paths tailored to avoid noise sensitive areas. However, these same procedures can be detrimental for the same reason because increased precision on flight paths can also concentrate noise over underlying communities.

While accuracy and repeatability can be desirable, there are a number of operational and safety issues that could benefit from judicious variation in flight paths. For example, in approach operations, a concentrated noise footprint stemming from repeatable operations creates noise issues for communities under the flight paths. In addition, fixed, consistent flight paths mean that air traffic controllers (ATC) lose some ability to fine-tune aircraft longitudinal spacing that the ATC once exercised by vectoring traffic. Furthermore, highly repeatable path-keeping traffic means a higher risk of loss of separation between aircraft if the concentrated portions of the traffic streams conflict.

Existing solutions related to path variation with use of RNP are limited to offsetting flight paths relative to the originally-defined procedure. For example, ATC may pull some traffic off of fixed routes to avoid or organize traffic using vectors. However, this negates efficiency and other benefits of fixed track use, and limits the ability of on-board aircraft systems to provide alerts supporting high integrity guidance and navigation. Further solutions provide for aircraft to fly an offset path, in which both the offset path and associated boundaries are shifted by an amount of the offset. However, this method is not usable in constrained airspace associated with arrival, approach and departure routes in a vicinity of airports where locations of original boundaries may be integral to safe operations.

What is needed is a method that enables use of full margins of an RNP procedure based on measured performance to retain efficiency while also addressing community noise concerns and constraints and managing the spacing/timing of aircraft.

SUMMARY

In one example, a method for flight path variation of an aircraft for noise management is described. The method includes receiving, at a communication interface of a computing device, information comprising noise inquiries of a community related to aircraft noise during flight over the community. An aircraft flight path is based on a required navigation performance (RNP) instrument flight procedure for the aircraft, and the RNP instrument flight procedure indicates a fixed-route accuracy and containment boundaries required during flight for the aircraft to fly a path between two points along a flight path. The containment boundaries are defined by a flight path centerline with limits determined by associated margins. The method also includes receiving, at the communication interface of the computing device, an output from one or more noise sensors positioned within the community, and the output indicates a noise level reading. The method also includes determining, by the computing device, a noise distribution plan for additional aircraft flying over the community so as to steer the additional aircraft and distribute additional aircraft noise in response to the noise inquiries and the output from the one or more noise sensors. The method also includes based on flight path data of the additional aircraft and the noise distribution plan, assigning a flight path modification to one of the additional aircraft via a data communication link. The flight path modification informs the one of the additional aircraft to adjust the flight path of the one of the additional aircraft to cause the one of the additional aircraft to remain within the associated margins of the RNP instrument flight procedure and to reduce noise impact to the community underneath the flight path.

In another example, a community noise flight path management system is described. The community noise flight path management system includes a communication interface for receiving information comprising noise inquiries of a community related to aircraft noise during flight over the community. An aircraft flight path is based on a required navigation performance (RNP) instrument flight procedure for the aircraft, and the RNP instrument flight procedure indicates a fixed-route accuracy and containment boundaries required during flight for the aircraft to fly a path between two points along a flight path, and the containment boundaries are defined by a flight path centerline with limits determined by associated margins. The communication interface also receives an output from one or more noise sensors positioned within the community and the output indicates a noise level reading. The community noise flight path management system also includes one or more processors for executing instructions stored on data storage to determine a noise distribution plan for additional aircraft flying over the community so as to steer the additional aircraft and distribute additional aircraft noise in response to the noise inquiries and the output from the one or more noise sensors. The community noise flight path management system also includes an output interface for outputting, based on flight path data of the additional aircraft and the noise distribution plan, a flight path modification to one of the additional aircraft via a data communication link. The flight path modification informs the one of the additional aircraft to adjust the flight path of the one of the additional aircraft to cause the one of the additional aircraft to remain within the associated margins of the RNP instrument flight procedure and to reduce noise impact to the community underneath the flight path.

In another example, a non-transitory computer readable storage medium having stored therein instructions, that when executed by a system having one or more processors, causes the system to perform functions is described. The functions include receiving information comprising noise inquiries of a community related to aircraft noise during flight over the community, and an aircraft flight path is based on a required navigation performance (RNP) instrument flight procedure for the aircraft. The RNP instrument flight procedure indicates a fixed-route accuracy and containment boundaries required during flight for the aircraft to fly a path between two points along a flight path, and the containment boundaries are defined by a flight path centerline with limits determined by associated margins. The functions also include receiving an output from one or more noise sensors positioned within the community, and the output indicates a noise level reading. The functions also include determining a noise distribution plan for additional aircraft flying over the community so as to steer the additional aircraft and distribute additional aircraft noise in response to the noise inquiries and the output from the one or more noise sensors. The functions also include based on flight path data of the additional aircraft and the noise distribution plan, assigning a flight path modification to one of the additional aircraft via a data communication link. The flight path modification informs the one of the additional aircraft to adjust the flight path of the one of the additional aircraft to cause the one of the additional aircraft to remain within the associated margins of the RNP instrument flight procedure and to reduce noise impact to the community underneath the flight path.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Described below are example systems and methods to implement variation in flight paths that can assist with the beneficial spreading or tailoring of a noise footprint stemming from repeatable operations as well as reducing concentrated traffic patterns for overflown communities.

An example method for flight path variation of an aircraft for noise management includes receiving noise inquiries of a community related to aircraft noise during flight over the community, receiving an output from noise sensors positioned within the community, in some examples utilizing other relevant community data such as geo-spatial and geo-temporal community information and relevant air traffic information such as information on aircraft flight plans, flight schedules and actual flight tracks, determining a noise distribution plan for additional aircraft flying over the community so as to steer the additional aircraft and distribute additional aircraft noise in response to the noise inquiries and the output from the noise sensors (and in some example, the other relevant community and air traffic data), and based on flight path data of the additional aircraft and the noise distribution plan, assigning a flight path modification to aircraft via voice communication or data communication links. The flight path modification informs the aircraft to adjust the flight path to remain within associated margins of a required navigation performance (RNP) instrument flight procedure, and to reduce noise impact to the community, particularly underneath the flight path.

Figure 1:
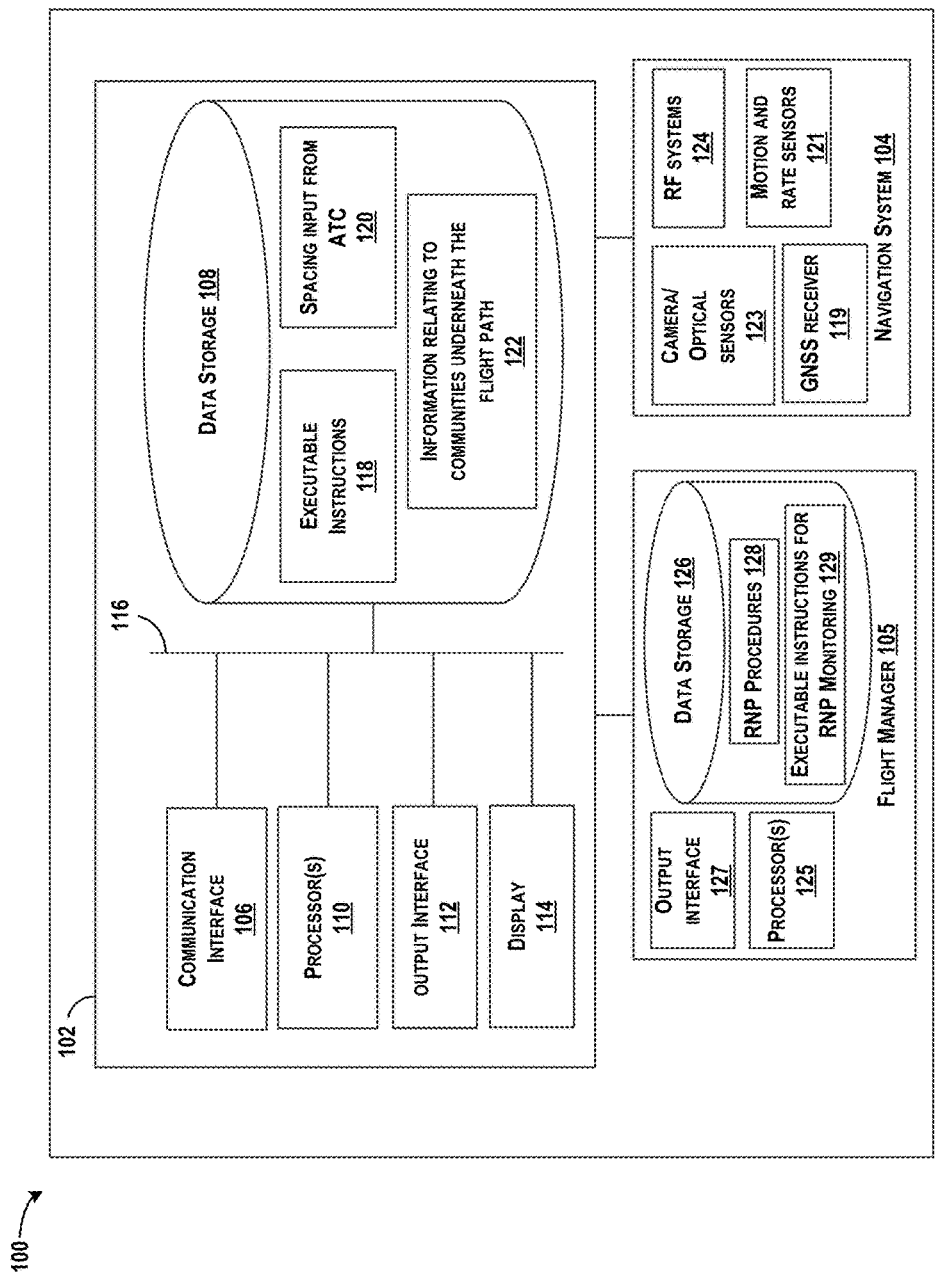
FIG. 1 is a block diagram of an aircraft, according to an example embodiment.

Referring now to FIG. 1, a block diagram of an aircraft 100 is illustrated, according to an example embodiment. The aircraft 100 includes a system 102 onboard the aircraft 100 that is in communication with a navigation system 104 and a flight manager 105 onboard the aircraft 100.

The system 102 includes a communication interface 106, data storage 108, one or more processor(s) 110, an output interface 112, and a display 114 each connected to a communication bus 116. The system 102 may also include hardware to enable communication within the system 102 and between the system 102 and other devices (not shown). The hardware may include transmitters, receivers, and antennas, for example.

The communication interface 106 may be a wireless interface and/or one or more wireline interfaces that allow for both short-range communication and long-range communication to one or more networks or to one or more remote devices. Such wireless interfaces may provide for communication under one or more wireless communication protocols, such as voice communications using Very High Frequency (VHF) radio, VHF Data link (VDL), VDL Mode 2, Aircraft Communications Addressing and Reporting System (ACARS) digital communications over VHF radio, satellite communications (SATCOM), Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network.

Thus, the communication interface 106 may be configured to receive input data from one or more devices, and may also be configured to send output data to other devices. In some examples, the communication interface 106 may also maintain and manage records of data received and sent by the system 102. The communication interface 106 may also include a receiver and transmitter to receive and send data. In other examples, the communication interface 106 may also include a user-interface, such as a keyboard, microphone, touchscreen, etc., to receive inputs as well.

In examples described below, the communication interface 106 receives real time positioning of the aircraft 100 during flight from the navigation system 104, and also receives an actual navigation performance (ANP) of the aircraft 100 as calculated or determined by real-time monitoring of uncertainty in received navigation signals from the navigation system 104. Thus, the ANP indicates a magnitude of potential uncertainty in the real time positioning of the aircraft 100 during flight. Furthermore, the communication interface 106 receives information for a required navigation performance (RNP) instrument flight procedure for the aircraft 100, from ground-based traffic controllers, or from the flight manager 105, that indicates a fixed-route accuracy and containment boundaries required during flight for the aircraft 100 to fly a path between two points along a flight path. The containment boundaries are defined by a flight path centerline with limits determined by associated margins.

The data storage 108 may include or take the form of one or more computer-readable storage media that can be read or accessed by the processor(s) 110. The computer-readable storage media can include volatile and/or non-volatile storage components, such as optical, magnetic, organic or other memory or disc storage, which can be integrated in whole or in part with the processor(s) 110. The data storage 108 is considered non-transitory computer readable media. In some embodiments, the data storage 108 can be implemented using a single physical device (e.g., one optical, magnetic, organic or other memory or disc storage unit), while in other embodiments, the data storage 108 can be implemented using two or more physical devices.

The data storage 108 thus is a non-transitory computer readable storage medium, and executable instructions 118 are stored thereon. The instructions 118 include computer executable code. When the instructions 118 are executed by the system 102 that has the one or more processor(s) 110, the system 102 is caused to perform functions. Such functions include calculating modifications to a flight path, and these functions are described more fully below.

The data storage 108 further stores spacing input 120 from an air traffic controller (ATC) that indicates spacing requirements between the aircraft 100 and one or more other aircraft, and information 122 relating to communities underneath the flight path. The spacing input 120 and the information 122 relating to communities underneath the flight path may be received at the communication interface 106 and then stored in the data storage 108.

The processor(s) 110 may be a general-purpose processor or a special purpose processor (e.g., digital signal processors, application specific integrated circuits, etc.). The processor(s) 110 may receive inputs from the communication interface 106, and process the inputs to generate outputs that are stored in the data storage 108 and output to the display 114. The processor(s) 110 can be configured to execute the executable instructions 118 (e.g., computer-readable program instructions) that are stored in the data storage 108 and are executable to provide the functionality of the system 102 described herein.

As one example, the processor(s) 110 execute the executable instructions 118 stored on the data storage 108 to calculate a modification to the flight path to be flown by the aircraft 100 that causes the aircraft 100 to remain within the containment boundaries of the RNP instrument flight procedure while reducing noise impact to the communities underneath the flight path and meeting the spacing requirements of the air traffic controller.

The processor(s) 110 can execute the executable instructions 118 stored in the data storage 108 to perform functions in real-time during flight of the aircraft 100. Such function can then occur with no or little delay to process additional data received from other sources or through manual input. The real time processing means that the processor(s) 110 perform the actions during flight of the aircraft 100. The real time processing may continually process information received from the communication interface 106. Put another way, the real time aspect includes the system 102 deciding to modify the flight path of the aircraft 100 substantially immediately upon receiving new or updated spacing requirements between the aircraft 100 and one or more other aircraft, and new or updated information 122 relating to communities underneath the flight path. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In one example, the information 122 relating to communities includes real time community noise inquiries received by the communication interface 106, and the processor(s) 110 further determine the modified flight path for the aircraft 100 so as to steer the aircraft 100, in approximately real time, in response to the information 122. Here, "approximately" indicates with little to no delay, or with no delay due to processing of additional data.

The output interface 112 outputs a modified flight path for the aircraft 100. The output interface 112 can output the modified flight path to the display 114 or to other aircraft or ground-based systems as well. Thus, the output interface 112 may be similar to the communication interface 106 and can be a wireless interface (e.g., transmitter) or a wired interface as well.

The navigation system 104 includes a Global Navigation Satellite System (GNSS) receiver 119 configured to provide data that is typical of well-known Global Positioning System (GPS) systems, such as the coordinates of the aircraft 100. Position estimates provided by the GNSS receiver 119 can be replaced or augmented to enhance accuracy and stability by inputs from other sensors, such motion and rate sensors 121, camera and optical sensors 123, and radio frequency (RF) systems 124. Such navigation data may be utilized by the system 102 for various functions, such as to navigate to a target position. The navigation system 104 may also include hardware to enable communication within the navigation system 104 and between the navigation system 104 and other devices (not shown). The hardware may include transmitters, receivers, and antennas, for example.

The navigation system 104 may also include other components such as a multi-mode receiver that uses other aviation-approved sources of navigation information. The RF systems 124 may include radar systems for ranging and target detection or Instrument Landing Systems (ILS) and various GNSS Augmentation Systems such as the Ground Based Augmentation System (GBAS). The camera and optical sensors 123 may include light detection and ranging (LIDAR) systems, laser detection and ranging (LADAR) systems, and/or an infrared or forward-looking infrared (FLIR) system, among other possibilities.

The camera and optical sensors 123 can also include an imaging system, such as a video camera, to capture image data from an environment. As a specific example, charge-coupled device (CCD) cameras or complementary metal-oxide-semiconductor (CMOS) cameras can be used, among other possibilities. Thus, the camera and optical sensors 123 can include a visual camera. The camera and optical sensors 123 can also include a night-vision camera and/or a forward looking infrared radar device or an infrared camera. The camera and optical sensors 123 may capture imagery of the environment and compare the imagery to what is expected given a current estimated position to help with navigation.

The flight manager 105 includes one or more processor(s) 125 that accesses data storage 126 to retrieve information for communication with the system 102 through an output interface 127. As one example, the flight manager 105 retrieves an RNP instrument flight procedure 128 for the aircraft 100 from the data storage 126 and provides the RNP instrument flight procedure 128 to the system 102 via the output interface 127. The RNP instrument flight procedure 128 indicates a fixed-route accuracy and containment boundaries required during flight for the aircraft 100 to fly a path between two points along a flight path. The processor(s) 125 may also execute instructions for RNP monitoring 129 stored within the data storage 126 to monitor a flight path of the aircraft 100.

The aircraft 100 can be operated using performance based flight path variation to intentionally add beneficial variability into aircraft track-keeping, while honoring any required performance constraints while executing PBN operations. New functions described herein provide variation management and alternate flight paths constrained by required performance that are integrated with existing flight management system functions. The functions can enhance safety by de-concentrating air traffic, reduce environmental impact by spreading noise, and can also provide additional longitudinal aircraft spacing control in arrival and approach operations.

The performance based flight path variation exploits existing measurement of real-time position uncertainty determined in an actual navigation performance (ANP) to dynamically bound potential track variation to predefined limits. The system 102 will add variability to the tracking performance during RNAV and RNP procedures while remaining within the constraints of the defined required performance by using real-time ANP. These functions can be used as airplane stand-alone capabilities to improve noise distributions, meet timing or spacing goals and/or to enhance safety by implementing airline specific open-loop variation distributions or aircrew input variations to address known or expected issue areas. These capabilities can also be integrated with ground systems to provide additional benefits.

Within examples, PBN and RNP implementations include limits on allowable variations, and containment boundaries of position of the aircraft 100 as referenced to a flight path centerline that can be tracked using real-time monitoring of the aircraft position and ANP uncertainty based on received navigation signals. RNP is distinct from general RNAV systems in that it requires a real-time measurement of ANP, which is an estimation of a maximum position uncertainty of the aircraft 100.

Generally, ANP has been used only as a trigger value for performance and alerting. Real-time determined ANP that is substantially better than required for the aircraft 100 to successfully execute a given RNP procedure has not been exploited. While guidelines for and certified budgets for flight paths may be on the order of half the required performance value (e.g., 0.5 nautical mile (NM) for an RNP 1 procedure), navigation systems can often provide a substantially smaller ANP (e.g., 0.04 NM). This difference, or a portion thereof, can be used in real-time to provide purposeful variation in a defined flight path. As ANP changes, the aircraft 100 can adjust allowed variations to ensure flight performance requirements are met.

Figure 2:
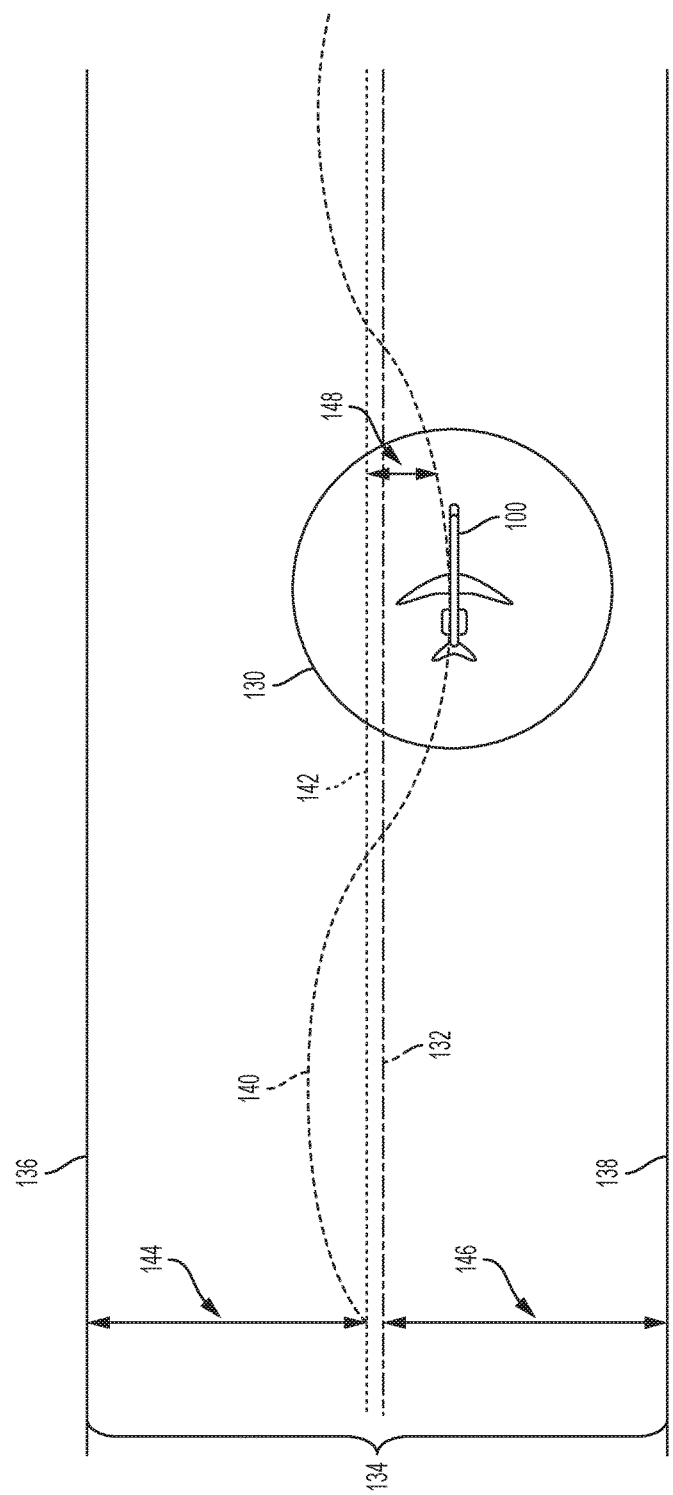
FIG. 2 is a diagram illustrating a flight path for the aircraft and an application of variability introduced to a flight path centerline.

FIG. 2 is a diagram illustrating a flight path for the aircraft 100 and an application of variability introduced to a flight path centerline. In FIG. 2, an ANP 130 of the aircraft 100 can be determined that indicates uncertainty in real time positioning of the aircraft 100 during flight based on information derived from the navigation system 104 onboard the aircraft 100. The ANP 130 is shown as an area in which the aircraft 100 is located to provide limits on a worst-case true physical position or geographic location of the aircraft 100. The ANP 130 may be determined based on a flight path centerline 142, which is based on a published procedure centerline flight path 132 information from the data storage 126 as well as the aircraft position and speed information available from the navigation system 104.

An RNP instrument flight procedure 134 for the aircraft 100 is shown to indicate a fixed-route accuracy and containment boundaries 136 and 138 required during flight for the aircraft 100 to fly a path between two points along the flight path 132. The containment boundaries 136 and 138 are defined by the published procedure centerline flight path 132 with limits determined by associated margins 144 and 146 on either side of the published procedure centerline flight path 132.

Since a possible location of the aircraft 100, represented by the ANP 130, is determined to be within the containment boundaries 136 and 138 of the RNP instrument flight procedure 134, there is additional spacing available within the margins 144 and 146 for use to add variability to the flight path centerline 142. Thus, the system 102 onboard the aircraft 100 can calculate a new flight path 140 to be flown by the aircraft 100. A modification to the flight path centerline 142 resulting in the new flight path 140 may be based on spacing input 120 received from the ATC that indicates spacing requirements between the aircraft 100 and one or more other aircraft, as well as information 122 relating to communities underneath the flight path centerline 142. The modification can be calculated so that the aircraft 100 remains within the containment boundaries 136 and 138 of the RNP instrument flight procedure 134 while reducing noise impact to the communities underneath the flight path centerline 142 and meeting the spacing requirements of the ATC.

In one example, the margin 144 is a distance away from the flight path centerline 142 along a first direction and the margin 146 is the same distance away from the flight path centerline 142 along a second direction, and a variation 148 can be calculated from the flight path centerline 142 along either direction (e.g., in FIG. 2 along the second direction) so as to be within the distance of the margin 146. Here, the aircraft 100 can then fly along the flight path 140 at the variation 148 from the flight path centerline 142 to introduce variability to the flight path 140. Thus, an alternate flight path can be calculated within the distance of the first margin 144 and the second margin 146 and accounting for the ANP 130.

As shown in FIG. 2, the variation 148 can be determined at different points along the flight path 140 due to changing values of the RNP instrument flight procedure 134 along the flight path centerline 142 and changing values of the ANP 130 during flight. Thus, the aircraft 100 can fly a dynamically varying flight path 140 on a straight procedure flight segment in the presence of varying ANP 130 while remaining with the allowed margins 144 and 146 about the flight path centerline 142.

An amount of the variation 148 can be determined based on a difference between the real time positioning of the aircraft 100 and the margin 146, and this difference can be used to limit the modification to the flight path 140 to be flown by the aircraft 100.

In other examples, the modification to the flight path 140 to be flown by the aircraft 100 can be based on a residual flight margin available for use that is due to the ANP 130, the flight path centerline 142, the RNP instrument flight procedure 134, and the containment boundaries 136 and 138. The calculated flight margin is a distance available on each side of the flight path centerline 142 within the containment boundaries 136 and 138 that is available for use after accounting for the ANP 130. A flight error tolerance may be established based on flight guidelines that enable some default error in flight path. Further, the flight margin can be determined at different points along the flight path 140 due to changing values of the RNP instrument flight procedure 134 along the flight path 140 and changing values of the ANP 130 during flight.

By applying modifications to the flight path 140, the aircraft 100 can be steered, in approximately real time, in response to the information 122 relating to communities underneath the published procedure centerline 134. This may enable more control of the distribution of aircraft noise over communities.

Figure 3:
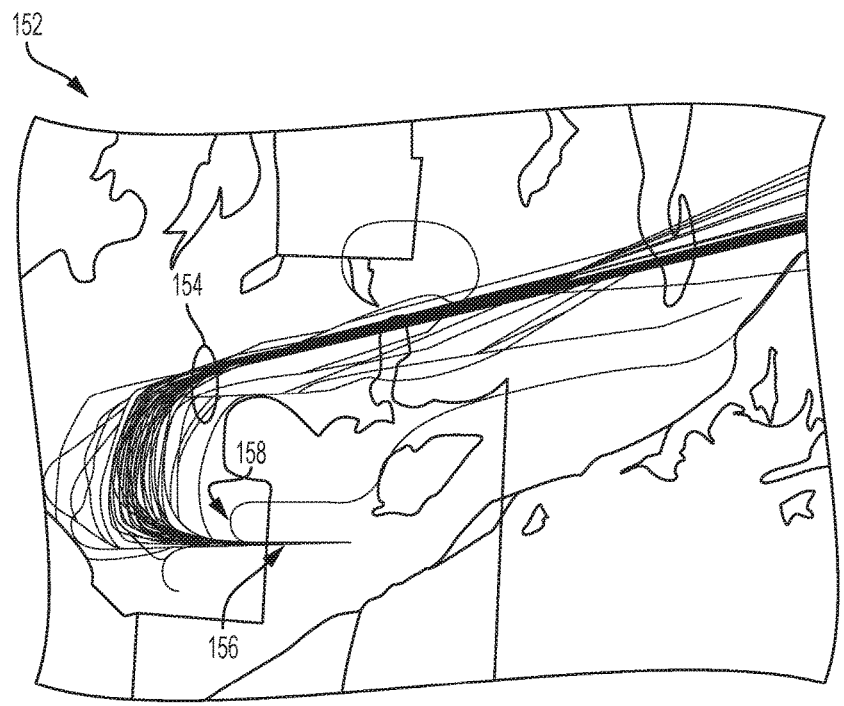
FIG. 3 illustrates an example an airport vicinity map of recorded flight paths for approaches to an airport, from which a community noise exposure map can be determined.

FIG. 3 illustrates an example an airport vicinity map 152 of recorded flight paths for approaches to an airport 156, from which a noise exposure map can be determined. FIG. 3 illustrates the very high repeatability and precise path following capabilities of RNP approaches 158 compared to a similar number of tracks from conventional traffic management 154, and also illustrates a need for introducing variability into flight paths.

Figure 4:
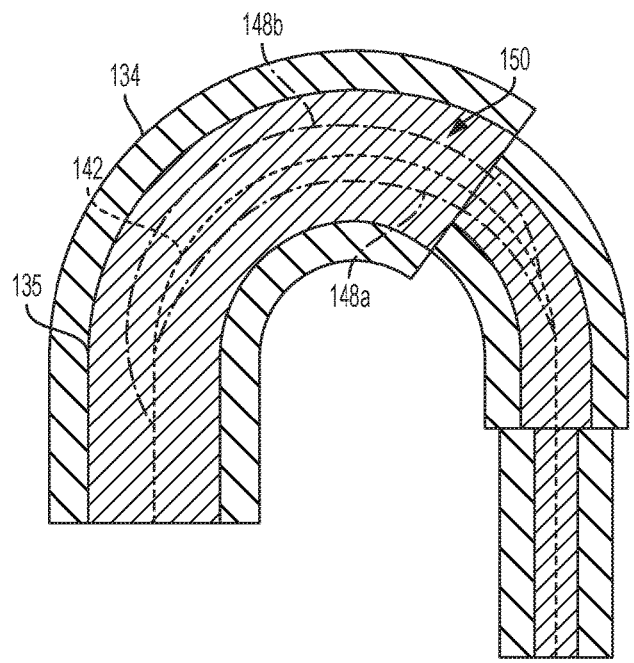
FIG. 4 is a diagram illustrating the flight path centerline, the associated margins of the RNP instrument flight procedure and an application of variability introduced in a context of a curved RNP approach procedure.

FIG. 4 is a diagram illustrating the flight path centerline 142 and an application of variability introduced in a context of a curved RNP approach procedure. In FIG. 4, variations 148*a-b* are shown at different points along the flight path but within the RNP procedure 134 boundaries and a boundary in consideration of measured ANP 135. The variation 148*a* is an example for a path deviation inside of the flight path centerline 142 during the turn, and the variation 148*b* is an example deviation outside of the flight path centerline 142. An available flight margin 150 is illustrated as the inner shaded area on either side of the flight path centerline 142. FIG. 4 illustrates an example where the designated RNP value in the published procedure centerline 134 changes and the measured ANP 135 remains constant, so the available flight margin 150 in which flight path variation can be applied is commensurably changed.

Figure 5:
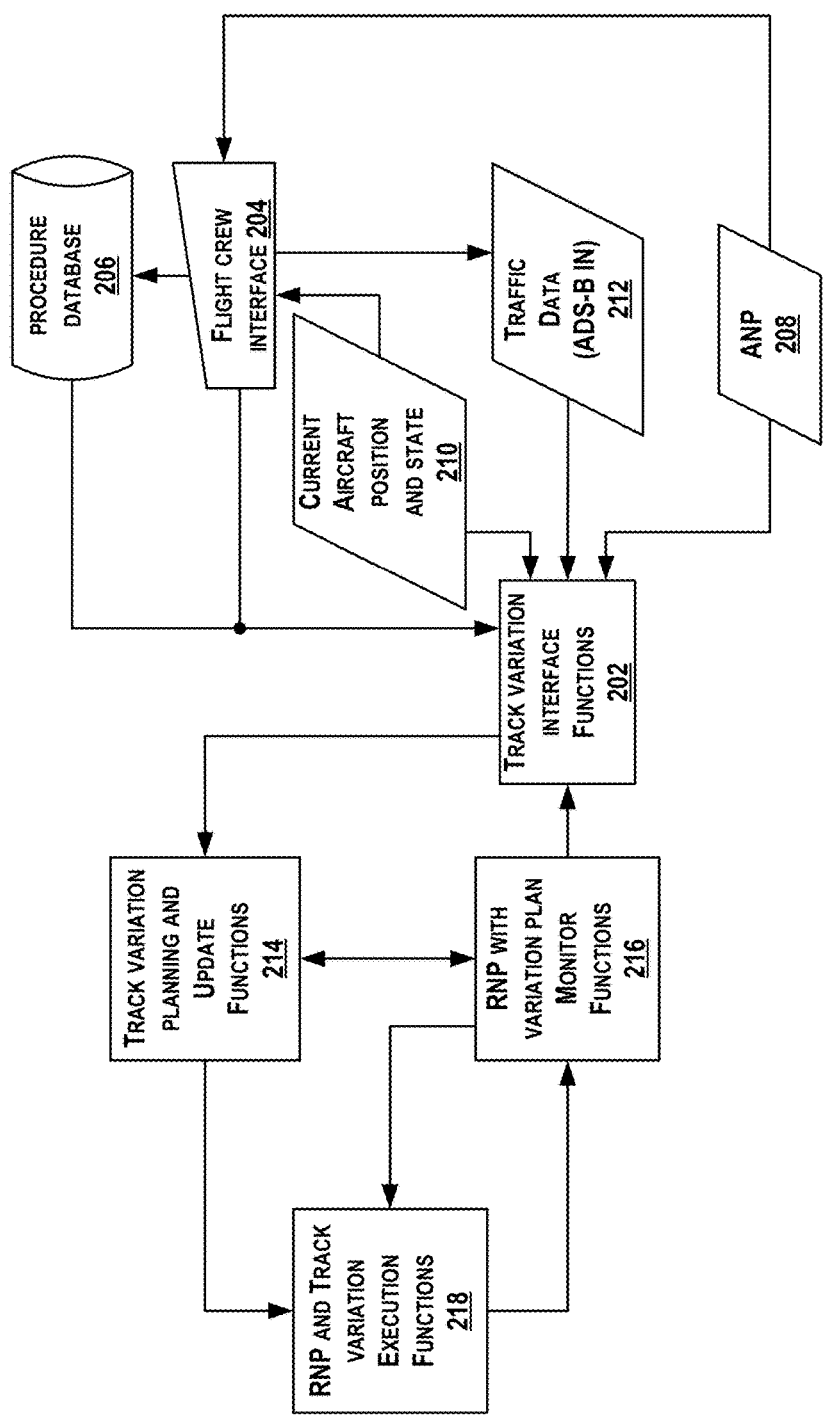
FIG. 5 is a block diagram illustrating example inputs to and functions performed by the aircraft to generate a variable flight path while remaining within the associated margins of the RNP instrument flight procedure.

FIG. 5 is a block diagram illustrating example inputs to and functions performed by the aircraft 100 to generate a variable flight path 140. Track Variation interface functions 202 include interfaces that receive or output information to and from external sources. Example information received may include user input from flight crew interfaces 204, such as implemented on a flight deck device with a control and display unit in the form of a page with selectable actions and parameters and text providing status or option choices. Other example information includes a flight manager or electronic flight bag instrument procedure database 206, which includes instrument procedures available to be flown by the aircraft 100 and all required data for a procedure, such as waypoints and path segments that define centerlines, RNP values etc. Further example information includes an ANP 208 input, current aircraft position and state 210 (including aircraft position and speed information available from the navigation system 104), and traffic data 212. The traffic data 212 includes automatic dependent surveillance-broadcast in (ADS-B IN) data including aircraft identification, position and speed broadcast by an aircraft. An ADS-B traffic processor receives these broadcasts from other nearby aircraft and assembles them into data, a map, or a picture of nearby traffic that can be used by various applications, for example, for aircrew situational awareness or in this case, noise spreading.

Track variation planning and update functions 214 receive information from the RNP interface functions 202, and define scope, objectives and limitations for variation in flight paths, and then also build the variation plan (or path) that will meet the objectives within the defined scope and limitations, including the limitation imposed by the procedure RNP bounds and the navigation performance. In an example where the objectives cannot be met within the limits and scope imposed, the Track Variation planning and update functions 214 can implement a "best effort" variation plan that scales the variation and the objectives to what is achievable or can request new objectives and/or scope from the user.

The track variation planning and update functions 214 thus use the RNP instrument flight procedure performance requirements, measured ANP 208, flight mode information from the user input or from a flight manager function, and the current and trends in previous position and state to determine the flight margin (FM) 150. The flight margin 150 may be a margin within the procedure's defined RNP procedure containment boundaries 136 and 138 that can be used for purposeful variation. The flight margin 150 is determined by the procedure's baseline centerline, the ANP and detected trends in dynamic ANP changes, and the flight technical error (FTE) budget for the current flight mode (e.g., auto flight, flight director or manually flown) based on current and downstream RNP designation. As an example, flight margin (FM)=RNP−ANP−FTE—a dynamically-adjusted buffer. The flight margin 150 is a margin or variation distance available on each side of the procedure baseline centerline, i.e., a flight margin of 0.5 NM means that the 0.5 NM on either side of the centerline is available to use for adding variation by generating a modified flight path 140.

The flight margin 150 may vary at different points along the planned route due to changing RNP values, for example, if the scope of the variable operation spans multiple RNAV/RNP procedures (e.g., an en-route, arrival, and approach procedures) or if a single procedure has different RNP values associated with different segments (e.g., many approach procedures have an RNP of 1 NM outside of the final approach fix (FAF) and 0.3 NM within the FAF). The flight margin 150 may also vary if ANP changes (for example, the number of GNSS satellites within view of the navigation system 104 changes).

The track variation planning and update functions 214 may also take into account general operational constraints and preferences. These may be associated with types of procedures (e.g., approaches), specific procedures (e.g., one of the approach procedures for a specific airport), all procedures, or procedures with certain characteristics (e.g., RNP of 0.5 or less). These constraints and preferences can take general forms (e.g., use only ½ of the available flight margin for variation) or can be specific (e.g., avoid a left 0.5 NM for the last 2 NM of approach procedure x.1).

The track variation planning and update functions 214 may also receive traffic location and velocity inputs from the traffic data ADS-B IN 212, develop traffic tracks over time, and combine data with instrument procedure data from procedure database 206 to build a variation-relevant picture of what nearby aircraft traffic is doing. The variation-relevant air traffic picture includes information indicating aircraft traffic and associated procedures of the traffic, and offsets or variations from the procedure baseline centerlines for each traffic aircraft. This variation-relevant air traffic picture can be used in developing a modified flight path 140 by positioning the aircraft path in a beneficial way with respect to nearby aircraft paths within the RNP procedure containment limits.

The track variation planning and update functions 214 determines applicable variations that may consider noise spreading or path spreading for safety or spacing enhancements by randomly selecting or specifying applicable variation targets. Some strategies for the variable path generation include random or deterministically-created fixed distance offsets, fixed margin offsets (e.g. offset related to RNP-ANP), damped pseudo-random path variation functions, fixed offset ADS-B stagger (e.g., maximize offset from aircraft(s) in front using other aircraft position feedback from ADS-B IN or other surveillance systems), or fixed margin ADS-B stagger paths. These modified paths are developed to remain within the relevant RNP procedure margins, including the consideration of changing ANP and FTE budgets.

The track variation planning and update functions 214 may also determine path stretching or compression for spacing and time-of-arrival control using sinusoidal or S-turn path stretching, constrained vectors path stretching (shallow angle off path, followed by shallow angle return to path, repeat as required), damped pseudo-random path variation, or curved segment shortening or lengthening.

The track variation planning and update functions 214 may use ADS-B or other air traffic position data to coordinate the spacing and time-of-arrival path variations with the paths and locations of other aircraft to enhance safety or to reduce noise impacts. These modified paths are developed to remain within the relevant RNP procedure margins, including the consideration of ANP and any FTE budgets.

The RNP with variation plan monitor functions 216 review outputs of the Track Variation planning and update functions 214 for changes that may occur due to changing ANP 208 input. The RNP with Variation Plan Monitor Functions 216 further display the performance of the aircraft with the respect to the bounding procedure baseline centerline based RNP boundaries, the current ANP 208, and the currently active variation path from the track variation planning and update functions 214.

Following, RNP path execution functions 218 cause the aircraft 100 to fly the modified flight path within the limits of the RNP procedure. The RNP path execution function 218 could, for example, take advantage of native functions within the flight manager 105 (as in FIG. 1) such as processors 125 and retrieval of executable instructions for RNP monitoring 129.

Figure 6:
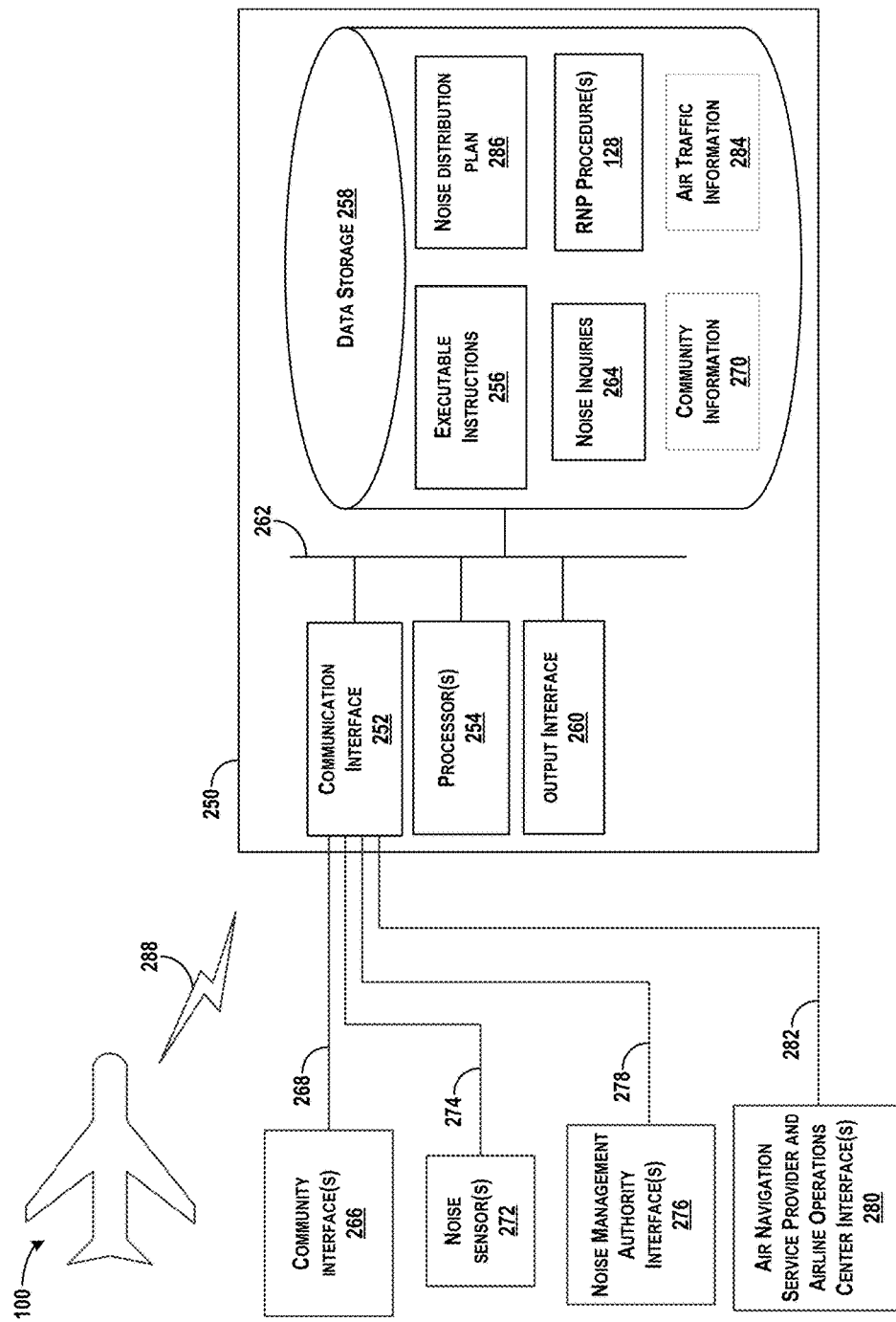
FIG. 6 is a block diagram of a community noise flight path management system, according to an example embodiment.

FIG. 6 is a block diagram of a community noise flight path management system 250, according to an example embodiment. The community noise flight path management system 250 includes a communication interface 252, one or more processor(s) 254 for executing instructions 256 stored on data storage 258, and an output interface 260 each connected to a communication bus 262. The community noise flight path management system 250 may also include hardware to enable communication within the community noise flight path management system 250 and between the community noise flight path management system 250 other devices (not shown). The hardware may include transmitters, receivers, and antennas, for example. The community noise flight path management system 250 may take the form of a computing device in some examples.

The communication interface 252 may be a wireless interface and/or one or more wireline interfaces that allow for both short-range communication and long-range communication to one or more networks or to one or more remote devices. Such wireless interfaces may provide for communication under one or more wireless communication protocols, such as voice communications using Very High Frequency (VHF) radio, VHF Data link (VDL), VDL Mode 2, Aircraft Communications Addressing and Reporting System (ACARS) digital communications over VHF radio and satellite communications (SATCOM), Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network.

Thus, the communication interface 252 may be configured to receive input data from one or more devices, and may also be configured to send output data to other devices. The communication interface 252 may also be or include a receiver and transmitter to receive and send data. In other examples, the communication interface 252 may also include a user-interface, such as a keyboard, microphone, touchscreen, etc., to receive inputs as well. In other examples, the communication interface 252 may also include a virtual user-interface, such as a website, server ports or other networked interfaces to receive inputs.

In examples described below, the communication interface 252 receives information including noise inquiries 264 of a community related to aircraft noise during flight over the community, and store the noise inquires 264 in the data storage 258. The noise inquires 264 may be received from community interface(s) 266 over a communication link 268. The communication link 268 may be a wireless or wired link.

The community interface(s) 266 may include ground based community interfaces accessible by the public to input noise inquiries, and can include a number of input interfaces such as websites, airport web portals, social media, telephone systems, e-mail systems, text message systems, etc. Thus, the community interface(s) 266 can include dedicated airport noise web portals, social media monitors, telephone call-in lines, airport noise e-mail and texts addresses and monitors, web crawlers or automated search capabilities for community websites and other means to allow community inputs or infer community noise needs.

The community interfaces 266 allow individuals in the community to input real-time noise inputs from impacted communities, as well as inputs from impacted communities on future noise mitigation needs. These inputs can be in a form of requests for noise mitigation, identification of noise sensitive events, including times and areas that are either ongoing or are planned. These inputs can also be dedicated noise mitigation requests or could be data that can be used to infer community noise mitigation needs such as school schedules, community event locations and schedules, etc. Data on community event locations and schedules, as well as data on community topography (for example street and building locations), as well as community noise relevant information such as local weather and atmospheric conditions and forecasts, noise related policies and agreements may be stored as community information 270 in the data storage 258. Thus, the community interface(s) 266 allow for input of real-time or current as well as future noise mitigation requests, and the requests can include identification of a noise sensitive event and associated time and area in the community as well as noise relevant community features and policies.

The communication interface 252 can also receive output from noise sensor(s) 272 positioned within the community over a communication link 274. The communication link 274 can be wireless or wired. The output from the noise sensor(s) 272 indicates a noise level reading. The output from the noise sensor(s) 272 also may include a sensor location, as the noise sensor(s) 272 may be static (permanently positioned), transient (moved periodically) or roving/mobile sensors mounted on vehicles. The noise sensor(s) 272 can be operated by third parties such as universities, local governmental (e.g., environmental agencies, city governments etc.), non-governmental groups (e.g., community or environmental advocacy groups) or even individual citizens via noise sensor apps on smartphones or centralized noise sensor applications (such as a server based website) that can infer noise levels from smart phone inputs.

The communication interface 252 may also receive input from the relevant noise management authorities 276, over a communication link 278. The communication link 278 can be wireless or wired. These inputs from the noise management authorities 276 include prioritizations, specific noise mitigation directions, plan and performance queries, noise plan approvals and modifications, and other system management actions. These noise management authority 276 inputs may be stored as community information 270 in the data storage 258.

The communication interface 252 may also receive input from the Air Navigation Service Providers (ANSPs) and Airline Operations Centers (AOCs) 280, over a communication link 282. The communication link 282 can be wireless or wired. These inputs from ANSPs and AOCs 280 include information on aircraft flight plans, aircraft arrival and departure schedules, aircraft tracking data, including radar tracks and ADS-B Out tracks, air traffic control requests or commands and other air traffic and airspace information. These ANSP and AOC 280 inputs may be stored as air traffic information 284 in the data storage 258.

The data storage 258 may include or take the form of one or more computer-readable storage media that can be read or accessed by the processor(s) 254. The computer-readable storage media can include volatile and/or non-volatile storage components, such as optical, magnetic, organic or other memory or disc storage, which can be integrated in whole or in part with the processor(s) 254. The data storage 258 is considered non-transitory computer readable media. In some embodiments, the data storage 258 can be implemented using a single physical device (e.g., one optical, magnetic, organic or other memory or disc storage unit), while in other embodiments, the data storage 258 can be implemented using two or more physical devices.

The data storage 258 thus is a non-transitory computer readable storage medium, and executable instructions 256 are stored thereon. The instructions 256 include computer executable code. When the instructions 256 are executed by the community noise flight path management system 250 that has the one or more processor(s) 254, the community noise flight path management system 250 is caused to perform functions. Such functions include calculating modifications to a flight path or developing a modification plan for multiple flight paths, and these functions are described more fully below.

The processor(s) 254 may be a general-purpose processor or a special purpose processor (e.g., digital signal processors, application specific integrated circuits, etc.). The processor(s) 254 may receive inputs from the communication interface 252, and process the inputs to generate outputs that are stored in the data storage 258 and output to the output interface 260. The processor(s) 254 can be configured to execute the executable instructions 256 (e.g., computer-readable program instructions) that are stored in the data storage 258 and are executable to provide the functionality of the community noise flight path management system 250 described herein.

In one example, the processor(s) 254 execute the instructions 256 stored on the data storage 258 to determine a noise distribution plan 286 for additional aircraft flying over the community so as to steer the additional aircraft and distribute additional aircraft noise in response to the noise inquiries 264 and the output from the noise sensor(s) 272 while taking into account relevant community information 270 including direction from noise management authorities 276 and air traffic conditions, airspace features and airline and/or air traffic controller requests and direction 284.

The data storage 258 further stores the noise distribution plan 286, and the required navigation performance (RNP) instrument flight procedure(s) 128 for aircraft. An aircraft flight path is based on the assigned RNP instrument flight procedure 134 from the RNP procedure database 128 for the aircraft. The RNP instrument flight procedure 134 that is provided to the aircraft 100 as shown and described in FIGS. 1 and 2 is inclusive of a fixed-route accuracy and the containment boundaries 136 and 138 required during flight for the aircraft to fly a path between two points along a flight path. The containment boundaries are defined by a flight path 132 with limits determined by associated margins 144 and 146.

Based on flight path data of the additional aircraft and the noise distribution plan 286, the output interface 260 outputs a flight path modification as determined by the processor(s) 254 to the aircraft 100 via a data communication link 288 as shown in FIG. 6. The data communication link 288 may be wireless and may provide for communication under one or more wireless communication protocols, such as voice communications using Very High Frequency (VHF) radio, VHF Data link (VDL), VDL Mode 2, Aircraft Communications Addressing and Reporting System (ACARS) digital communications over VHF radio, satellite communications (SATCOM), Long-Term Evolution (LTE), cellular communications, and/or other wireless communication protocols. Thus, the output interface 260 may be similar to the communication interface 252 and can be a wireless interface (e.g., transmitter) as well as providing wired communications where appropriate.

The flight path modification informs the aircraft 100 to adjust the flight path 132 of the aircraft 100 to cause the aircraft 100 to remain within the associated margins 144 and 146 of the RNP instrument flight procedure 134 and to reduce noise impact to the community underneath the flight path 132. A modification to the flight path centerline 142 resulting in the new flight path 140 may be based on the noise distribution plan 286.

The flight path modification request communicated by the community noise flight path management system 250 to the aircraft 100 via a data communication link 288 can range from a simple pre-coordinated or pre-set path variation request, perhaps suitable to be communicated by voice, or a request for a target change in spacing or a target change in time of arrival, to a request for a target variation path defined in detail, communicated for example by digital datalink.

Various levels of integration with existing aircraft and ground communications systems can be used to convey a flight path modification request. The flight path modification request communicated by the flight path management system 250 to the aircraft 100 via the data communication link 288 may use direct communications between the flight path management system 250 communication interface 252 and the aircraft 100 communication interface 106. The flight path modification request may alternatively utilize existing aircraft 100 and ground system communication systems and links that interface to the respective communication interfaces. Alternatively, the flight path modification request may be implemented as voice communications between ground based controllers and the flight crew with the requisite data be retrieved from or entered into the flight path management system 250 and aircraft system 102 via their respective communications and output interfaces.

The processor(s) 254 can execute the executable instructions 256 stored in the data storage 258 to perform functions in real-time during flight of the aircraft 100. Such function can then occur with no or little delay to process additional data received from other sources or through manual input. The real time processing means that the processor(s) 254 perform the actions during flight of the aircraft 100. The real time processing may continually process information received from the communication interface 252. Put another way, the real time aspect includes the community noise flight path management system 250 deciding to modify the flight path of the aircraft 100 substantially immediately upon receiving new or updated noise inquires. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. Pilot input and received via the communication interface 204 can also limit or prohibit these automated actions.

Figure 7:
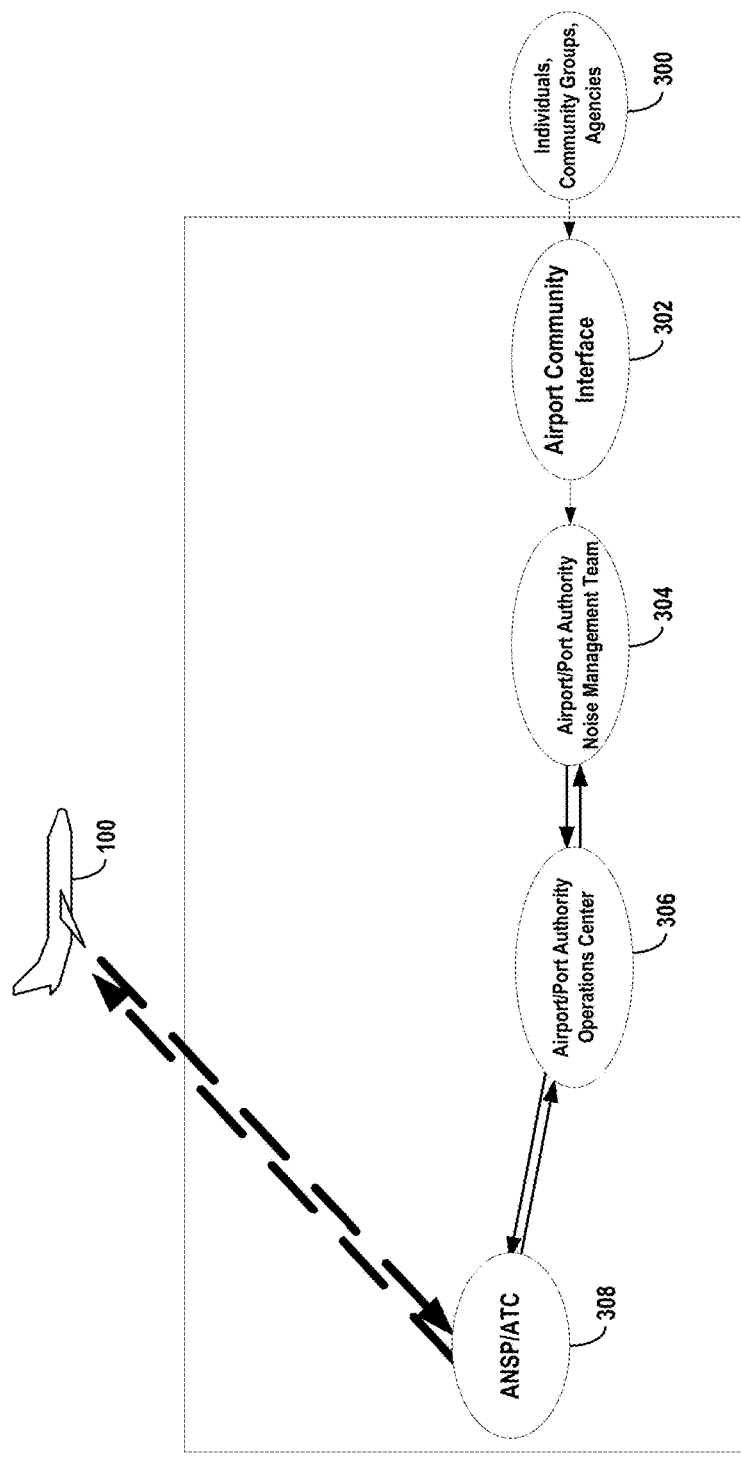
FIG. 7 is a block diagram illustrating example dataflow between the aircraft and the community noise flight path management system as implemented in an airport to generate a variable flight path.

FIG. 7 is a block diagram illustrating example dataflow between the aircraft 100 and the community noise flight path management system 250 as implemented in an airport to generate a variable flight path 140. At block 300, individuals, community groups, or agencies may provide reports or requests including noise inquires to an airport community interface. At block 302, an airport or airline noise management function may receive the data from the community at the community interface and other inputs as monitored. At block 304, an airport/port authority noise management team can make noise remediation decisions that are then implemented as target noise distribution plans.

At block 306, an airport/port authority operations center uses flight tracking and flight plan data to determine an offset or variation target to be assigned and communicated to specific aircraft. Feedback from the aircraft on its ability to meet the requested target is then used to update the distribution plans.

At block 308, an air navigation service provider (ANSP) or air traffic controller (ATC) receives the assigned variation and wirelessly communicates the variation to the aircraft 100. The aircraft 100 also communicates an acceptance, modification (for example a best effort version of the requested variation) or rejection of the variation based on capabilities of the aircraft 100.

Functions shown in block 302, 304, 306 and 308 may occur in an airport or other ground based system, or through a virtual user-interface such as a website, server ports or other connection to a networked location.

The variations are assigned to a given aircraft via data link or voice communication and implemented and flown by the aircraft to extent achievable while remaining within the current procedure limitations and other offset or variation limitations. The aircraft involved may have the performance based track variation for aircraft flight management capability with data link or voice communications and inherent aircraft PBN capabilities. However, other aircraft that do not operate or are not equipped with the performance based track variation for aircraft flight management capability of the system 102 can utilize benefits here as well with the ground segment sending variation requests to un-equipped aircraft. In the latter case, the aircrew would then either input the variation using existing offset capabilities in the flight management systems or would fly to the directed offset or variation using aircraft instruments such as a Horizontal Situation Indicator (HSI). In addition, the crew may monitor existing navigation performance feedback, using aircraft instruments such as navigation performance scales. The ground based system method for RNAV aircraft would have an advantage of providing some of the noise benefits and the community responsiveness at an earlier time than that supported by avionics and aircraft equipage updates.

Figure 8:
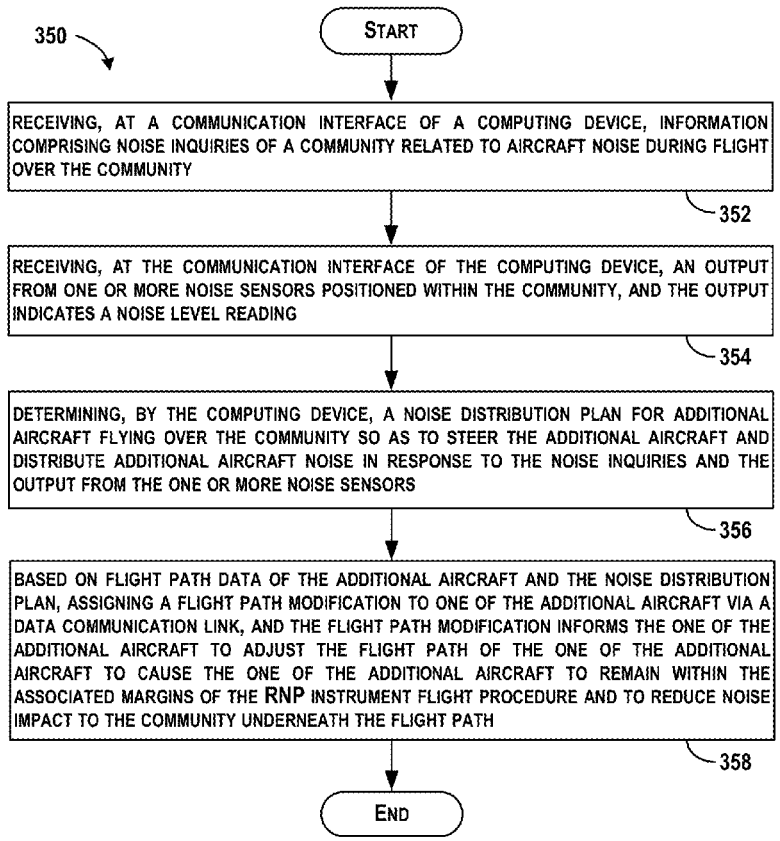
FIG. 8 shows a flowchart of an example method 350 for flight path variation of the aircraft 100 for noise management, according to an example embodiment.

FIG. 8 shows a flowchart of an example method 350 for flight path variation of the aircraft 100 for noise management, according to an example embodiment. Method 350 shown in FIG. 8 presents an embodiment of a method that could be used with the aircraft 100 shown in FIG. 1, for example, and may be performed by the community noise flight path management system 250 shown in FIG. 6. Further, devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 350 may include one or more operations, functions, or actions as illustrated by one or more of blocks 352-358. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 8 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 352, the method 350 includes receiving, at the communication interface 252 of a computing device, information comprising noise inquiries 264 of a community related to aircraft noise during flight over the community. The aircraft flight path 132 is based on the RNP instrument flight procedure 134 for the aircraft 100, and the RNP instrument flight procedure 134 indicates a fixed-route accuracy and the containment boundaries 136 and 138 required during flight for the aircraft 100 to fly a path between two points along the flight path 132. The containment boundaries 136 and 138 are defined by the flight path centerline 142 with limits determined by associated margins 144 and 146.

In some examples, the information comprising the noise inquiries includes inputs from the community regarding current and future noise mitigation requests. In other examples, the information comprising the noise inquiries includes identification of a noise sensitive event and associated time and area in the community.

At block 354, the method 350 includes receiving, at the communication interface 252 of the computing device, an output from one or more noise sensors 272 positioned within the community. The output indicates a noise level reading.

Within additional examples, the method 350 may also include receiving, at the communication interface 252 of the computing device, inputs from relevant noise management authorities 276 including prioritizations and specific noise mitigation directions. Further, the method 350 can additional include receiving, at the communication interface 252 of the computing device, inputs from air navigation service providers and airline operations centers 280 including air traffic control requests, air traffic information and airspace information.

At block 356, the method 350 includes determining, by the computing device, a noise distribution plan for additional aircraft flying over the community so as to steer the additional aircraft and distribute additional aircraft noise in response to the noise inquiries 264 and the output from the one or more noise sensors 272. When additional inputs from the noise management authorities 276 and the inputs from the air navigation service providers and airline operations centers 280 are received, such additional inputs can be further used by the computing device to determine the noise distribution plan.

In one example, the noise distribution plan can be determined in real-time for the additional aircraft scheduled to fly over the community. The noise distribution plan includes determining modified flight paths for at least one of the additional aircraft flying over the community. The noise distribution plan may be further based on aircraft-specific noise footprints of the additional aircraft scheduled to fly over the community.

In further examples, the noise distribution plan is further based on (i) a noise sensitivity map of the community indicating areas of high sensitivity, (ii) a noise mitigation prioritization map indicating a mapping of values for the noise level in the community and associated prioritization of community noise requirements for areas, and (iii) an air traffic flow map. The noise maps can be generated due to the received noise inquires or known areas with noise problems. For example, community geo-spatial data can be used to develop maps or models of community characteristics that are relevant to noise impacts and mitigation. These inputs are quite diverse and include such sources and data and topographic survey with maps providing community topography details, e.g., terrain with the potential to focus or block noise, natural noise corridors such as bays and rivers and other geographic information, census data with population locations and density information, phone-book type information with residential and business location information, local maps (university maps or city maps) with specific details on potentially noise sensitive locations (e.g., schools, parks, stadiums, quads etc.), and local weather data including temperature and cloud/rain information.

As a specific example, time-based arrival or departure corridor noise distribution plans can be determined to cause the aircraft to fly a variation in the flight path so as to avoid the area with the noise concern. Such variations can include any of those as described with reference to FIG. 2. In this manner, not all aircraft scheduled to fly over an area with a noise concern will do so, and some of the aircraft can be diverted (even if just slightly) so as to mitigate noise to the target area.

A noise distribution plan may be based on certain goals, such as to lower noise experienced by a target area over a time period. Thus, aircraft may still fly over the target area, but perhaps using varied flight paths, or simply less aircraft will fly over the target area during the time period. Other goals may include simply distributing noise more evenly so that aircraft do not fly the same pattern during each departure or arrival, for example.

At block 358, the method 350 includes based on flight path data of the additional aircraft and the noise distribution plan, assigning a flight path modification to one of the additional aircraft via the data communication link 288. The flight path modification informs the one of the additional aircraft to adjust the flight path 132 of the one of the additional aircraft to cause the one of the additional aircraft to remain within the associated margins 144 and 146 of the RNP instrument flight procedure 134 and to reduce noise impact to the community underneath the published procedure centerline flight path 132.

In some examples, assigning the flight path modification is further based on aircraft-specific capabilities.

In additional examples, the flight path data includes real time aircraft tracking of the additional aircraft scheduled to fly over the community, and the flight path modification is assigned to a given aircraft in flight and scheduled to fly over the community.

Furthermore, as described above, the associated margins 144 and 146 of the RNP instrument flight procedure 134 include the first margin 144 a distance away from the flight path centerline 142 along a first direction and the second margin 146 the distance away from the flight path centerline 142 along a second direction, and thus, the flight path modification can be assigned as a distance away from the flight path centerline 142 along the first direction within the distance of the first margin 144.

Figure 9:
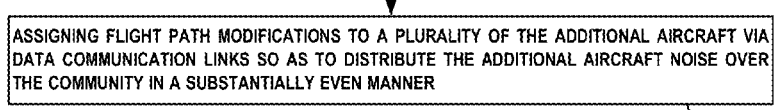
FIG. 9 shows a flowchart of an example method for use with the method 350, according to an example embodiment.

FIG. 9 shows a flowchart of an example method for use with the method 350, according to an example embodiment. At block 360, functions include assigning flight path modifications to a plurality of the additional aircraft via data communication links so as to distribute the additional aircraft noise over the community in a specified manner, such as a substantially even manner. In this way, a number of aircraft can be assigned to divert flight paths so as to avoid the area noted as a noise concern area within the noise inquires 264.

Figure 10:
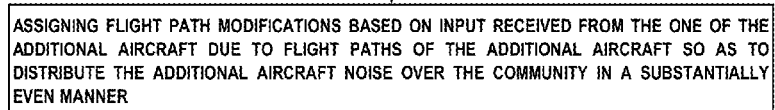
FIG. 10 shows a flowchart of an example method for use with the method 350, according to an example embodiment.

FIG. 10 shows a flowchart of an example method for use with the method 350, according to an example embodiment. At block 362, functions include assigning flight path modifications based on input received from the one of the additional aircraft due to flight paths of the additional aircraft so as to distribute the additional aircraft noise over the community in a specified manner, such as a substantially even manner. Such input can include capabilities of the aircraft to perform any variations, as well as real-time location data of the aircraft.

Figure 11:
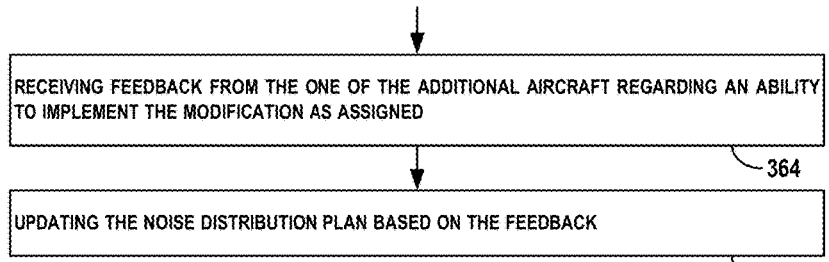
FIG. 11 shows a flowchart of an example method for use with the method 350, according to an example embodiment.

FIG. 11 shows a flowchart of an example method for use with the method 350, according to an example embodiment. At block 364, functions include receiving feedback from the one of the additional aircraft regarding an ability to implement the modification as assigned, and at block 366, functions include updating the noise distribution plan based on the feedback. In an example, if a certain aircraft is unable to performed the assigned modification, possibly aircraft scheduled to fly over the community in the future can be diverted so as to lower a total amount of noise experienced by the area over a time period.

Figure 12:
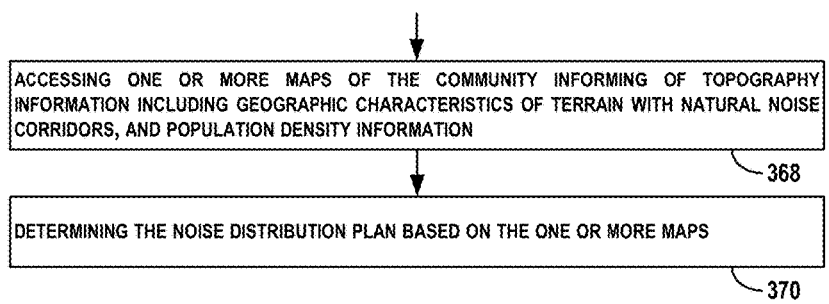
FIG. 12 shows a flowchart of an example method for use with the method 350, according to an example embodiment.

FIG. 12 shows a flowchart of an example method for use with the method 350, according to an example embodiment. At block 368, functions include accessing one or more maps of the community informing of topography information including geographic characteristics of terrain with natural noise corridors and population density information, and at block 370 functions include determining the noise distribution plan based on the one or more maps. In this example, area of high population density can be identified and aircraft can be diverted so as to attempt to avoid such areas.

Figure 13:
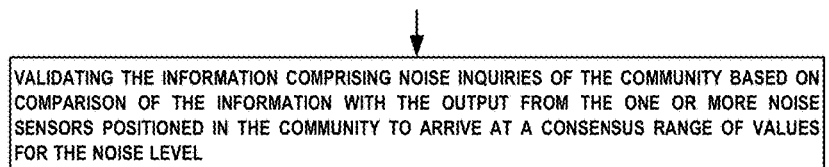
FIG. 13 shows a flowchart of an example method for use with the method 350, according to an example embodiment.

FIG. 13 shows a flowchart of an example method for use with the method 350, according to an example embodiment. At block 372, functions include validating the information comprising noise inquiries of the community based on comparison of the information with the output from the one or more noise sensors positioned in the community to arrive at a consensus range of values for the noise level. In some examples, when noise inquiries from the community do not match noise level readings form noise sensors positioned in the community, the noise inquiries can be considered erroneous and/or the noise sensors may be serviced to determine accuracy as well.

Figure 14:
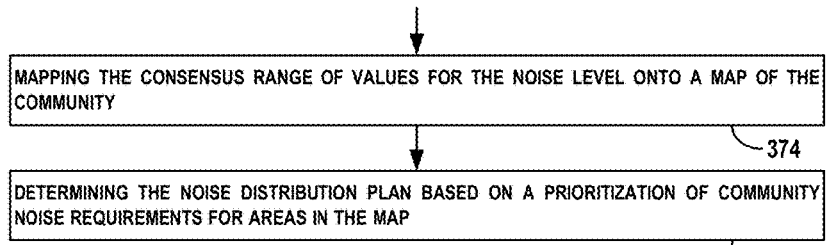
FIG. 14 shows a flowchart of an example method for use with the method 350, according to an example embodiment.

FIG. 14 shows a flowchart of an example method for use with the method 350, according to an example embodiment. At block 374, functions include mapping the consensus range of values for the noise level onto a map of the community, and at block 376 the functions include determining the noise distribution plan based on a prioritization of community noise requirements for areas in the map. In this example, areas in a community that receive an amount of noise inquires over a threshold amount can be highlighted on a map and prioritized as areas to avoid by aircraft.

Within examples described herein, the community noise flight path management system 250 provides airport and airline noise managers with a tool to dynamically distribute aircraft noise, and control noise concentrations locally to respond to community needs. This capability potentially provides significant benefits with either new or existing airspace and procedure designs including reductions in periodic peak noise experienced at worst case locations on the order of 1 decibel (dB) to 10 dB or more.

Example systems and methods described enable many benefits including noise spreading, localized (and potentially dynamic) noise avoidance, and path stretching or compression for longitudinal spacing adjustments (ground requested or aircrew initiated). Further, safety enhancements can be realized using path variation randomization to further decrease a probability that inadvertently co-path flights are on the same path.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for flight path variation of an aircraft for noise management, comprising:

receiving, at a communication interface of a computing device that includes one or more processors and data storage storing instructions executable by the one or more processors, information comprising noise inquiries of a community related to aircraft noise during flight over the community, wherein an aircraft flight path is based on a required navigation performance (RNP) instrument flight procedure for the aircraft, wherein the RNP instrument flight procedure indicates a fixed-route accuracy and containment boundaries required during flight for the aircraft to fly a path between two points along a flight path, and wherein the containment boundaries are defined by a flight path centerline with limits determined by associated margins;

receiving, at the communication interface of the computing device, an output from one or more noise sensors positioned within the community, wherein the output indicates a noise level reading;

determining, by the computing device, a noise distribution plan for additional aircraft flying over the community so as to steer the additional aircraft and distribute additional aircraft noise in response to the noise inquiries and the output from the one or more noise sensors; and based on flight path data of the additional aircraft and the noise distribution plan, assigning a flight path modification to one of the additional aircraft via a data communication link, wherein the flight path modification informs the one of the additional aircraft to adjust the flight path of the one of the additional aircraft to cause the one of the additional aircraft to remain within the associated margins of the RNP instrument flight procedure and to reduce noise impact to the community underneath the flight path.

2. The method of claim 1, wherein the information comprising the noise inquiries comprises inputs from the community regarding current and future noise mitigation requests.

3. The method of claim 1, wherein the information comprising the noise inquiries comprises identification of a noise sensitive event and associated time and area in the community.

4. The method of claim 1, wherein determining the noise distribution plan comprises determining in real-time the noise distribution plan for the additional aircraft scheduled to fly over the community.

5. The method of claim 1, wherein determining the noise distribution plan comprises determining modified flight paths for at least one of the additional aircraft flying over the community.

6. The method of claim 1, wherein determining the noise distribution plan is further based on aircraft-specific noise footprints of the additional aircraft scheduled to fly over the community.

7. The method of claim 1, wherein determining the noise distribution plan is further based on (i) a noise sensitivity map of the community indicating areas of high sensitivity, (ii) a noise mitigation prioritization map indicating a mapping of values for the noise level in the community and associated prioritization of community noise requirements for areas, and (iii) an air traffic flow map.

8. The method of claim 1, wherein assigning the flight path modification to the one of the additional aircraft is further based on aircraft-specific capabilities.

9. The method of claim 1, wherein the flight path data include real time aircraft tracking of the additional aircraft scheduled to fly over the community, and wherein assigning the flight path modification to the one of the additional aircraft comprises assigning the flight path modification to a given aircraft in flight and scheduled to fly over the community.

10. The method of claim 1, wherein the associated margins of the RNP instrument flight procedure include a first margin a distance away from the flight path centerline along a first direction and a second margin the distance away from the flight path centerline along a second direction, and wherein assigning the flight path modification to the one of the additional aircraft comprises:

assigning the flight path modification along the first direction within the distance of the first margin.

11. The method of claim 1, further comprising assigning flight path modifications to a plurality of the additional aircraft via the data communication link so as to distribute the additional aircraft noise over the community in a specified manner.

12. The method of claim 1, further comprising assigning flight path modifications based on input received from the one of the additional aircraft due to flight paths of the additional aircraft so as to distribute the additional aircraft noise over the community in a specified manner.

13. The method of claim 1, further comprising:

receiving feedback from the one of the additional aircraft regarding an ability to implement the modification as assigned; and updating the noise distribution plan based on the feedback.

14. The method of claim 1, further comprising:

accessing one or more maps of the community informing of topography information including geographic characteristics of terrain with natural noise corridors, and population density information; and determining the noise distribution plan based on the one or more maps.

15. The method of claim 1, further comprising:

validating the information comprising noise inquiries of the community based on comparison of the information with the output from the one or more noise sensors positioned in the community to arrive at a consensus range of values for the noise level.

16. The method of claim 15, further comprising:

mapping the consensus range of values for the noise level onto a map of the community; and determining the noise distribution plan based on a prioritization of community noise requirements for areas in the map.

17. A community noise flight path management system comprising:

a communication interface for receiving information comprising noise inquiries of a community related to aircraft noise during flight over the community, wherein an aircraft flight path is based on a required navigation performance (RNP) instrument flight procedure for the aircraft, wherein the RNP instrument flight procedure indicates a fixed-route accuracy and containment boundaries required during flight for the aircraft to fly a path between two points along a flight path, and wherein the containment boundaries are defined by a flight path centerline with limits determined by associated margins, and the communication interface for receiving an output from one or more noise sensors positioned within the community and the output indicates a noise level reading;

one or more processors for executing instructions stored on data storage to determine a noise distribution plan for additional aircraft flying over the community so as to steer the additional aircraft and distribute additional aircraft noise in response to the noise inquiries and the output from the one or more noise sensors; and an output interface for outputting, based on flight path data of the additional aircraft and the noise distribution plan, a flight path modification to one of the additional aircraft via a data communication link, wherein the flight path modification informs the one of the additional aircraft to adjust the flight path of the one of the additional aircraft to cause the one of the additional aircraft to remain within the associated margins of the RNP instrument flight procedure and to reduce noise impact to the community underneath the flight path.

18. The community noise flight path management system of claim 17, wherein the one or more processors further determine the noise distribution plan for the additional aircraft flying over the community based on (i) a noise sensitivity map of the community indicating areas of high sensitivity, (ii) a noise mitigation prioritization map indicating a mapping of values for the noise level in the community and associated prioritization of community noise requirements for areas, and (iii) an air traffic flow map.

19. A non-transitory computer readable storage medium having stored therein instructions, that when executed by a system having one or more processors, causes the system to perform functions comprising:

receiving information comprising noise inquiries of a community related to aircraft noise during flight over the community, wherein an aircraft flight path is based on a required navigation performance (RNP) instrument flight procedure for the aircraft, wherein the RNP instrument flight procedure indicates a fixed-route accuracy and containment boundaries required during flight for the aircraft to fly a path between two points along a flight path, and wherein the containment boundaries are defined by a flight path centerline with limits determined by associated margins;

receiving an output from one or more noise sensors positioned within the community, wherein the output indicates a noise level reading;

determining a noise distribution plan for additional aircraft flying over the community so as to steer the additional aircraft and distribute additional aircraft noise in response to the noise inquiries and the output from the one or more noise sensors; and based on flight path data of the additional aircraft and the noise distribution plan, assigning a flight path modification to one of the additional aircraft via a data communication link, wherein the flight path modification informs the one of the additional aircraft to adjust the flight path of the one of the additional aircraft to cause the one of the additional aircraft to remain within the associated margins of the RNP instrument flight procedure and to reduce noise impact to the community underneath the flight path.

20. The non-transitory computer readable storage medium of claim 19, wherein the associated margins of the RNP instrument flight procedure include a first margin a distance away from the flight path centerline along a first direction and a second margin the distance away from the flight path centerline along a second direction, and wherein the function of assigning the flight path modification to the one of the additional aircraft comprises:

assigning the flight path modification as a distance away from the flight path centerline along the first direction within the distance of the first margin.

\* \* \* \* \*